(12) United States Patent  
Kerzerho et al.

(10) Patent No.: US 12,054,804 B2  
(45) Date of Patent: Aug. 6, 2024

(54) METHOD FOR THE TREATMENT OF IRON-CONTAINING SLUDGE

(71) Applicant: ArcelorMittal, Luxembourg (LU)

(72) Inventors: Gaelle Kerzerho, Maizieres les Metz (FR); Helene Boucard, Maizieres les Metz (FR); Ana-Maria Iosif, Maizieres les Metz (FR)

(73) Assignee: ArcelorMittal, Luxembourg (LU)

( * ) Notice: Subject to any disclaimer, the term of this patent is extended or adjusted under 35 U.S.C. 154(b) by 519 days.

(21) Appl. No.: 16/755,789

(22) PCT Filed: Dec. 13, 2018

(86) PCT No.: PCT/IB2018/060013  
§ 371 (c)(1),  
(2) Date: Apr. 13, 2020

(87) PCT Pub. No.: WO2019/123138  
PCT Pub. Date: Jun. 27, 2019

(65) Prior Publication Data  
US 2021/0371953 A1 Dec. 2, 2021

(30) Foreign Application Priority Data  
Dec. 22, 2017 (WO) .................. PCT/IB2017/058327

(51) Int. Cl.  
*C22B 19/00* (2006.01)  
*C22B 3/00* (2006.01)  
(Continued)

(52) U.S. Cl.  
CPC ............. *C22B 19/22* (2013.01); *C22B 7/007* (2013.01); *C22B 7/02* (2013.01); *C22B 13/045* (2013.01)

(58) Field of Classification Search  
CPC ........... C22B 19/22; C22B 7/007; C22B 7/02; C22B 13/045  
See application file for complete search history.

(56) References Cited

U.S. PATENT DOCUMENTS

2017/0058378 A1* 3/2017 Piezanowski ........... C22B 19/00  
2019/0177815 A1 6/2019 Giordana et al.

FOREIGN PATENT DOCUMENTS

CN 103857811 A 6/2014  
CN 105967222 A 9/2016  
(Continued)

OTHER PUBLICATIONS

See International Search Report of PCT/IB2018/060013, dated Mar. 27, 2019.  
(Continued)

*Primary Examiner* — Zulmariam Mendez  
(74) *Attorney, Agent, or Firm* — Davidson Kappel LLC

(57) ABSTRACT

A method for the treatment of sludge containing iron, the method including a leaching step wherein the sludge containing iron is mixed with an acid and an oxidation agent so as to create an oxidized leachate, and a step of precipitation of iron wherein the oxidized leachate is mixed with a neutralizing agent so as to create a mixture composed of a solid part including precipitated iron and of a liquid part, the neutralizing agent including at least 30% in weight of dust recovered from a bag filter treatment of ironmaking, steelmaking, coke making or sintering gas.

18 Claims, 1 Drawing Sheet

(51) Int. Cl.
*C22B 7/00* (2006.01)
*C22B 7/02* (2006.01)

(56) References Cited

FOREIGN PATENT DOCUMENTS

| | | |
|---|---|---|
| EP | 0427341 A1 | 5/1991 |
| EP | 0427341 A1 | 5/1991 |
| EP | 1954843 B1 | 1/2013 |
| JP | S62136534 A | 6/1987 |
| JP | S62139805 A | 6/1987 |
| JP | H05263156 A | 10/1993 |
| JP | H0797638 A | 4/1995 |
| KR | 20160124160 A | 10/2016 |
| KR | 20170133494 A | 12/2017 |
| RU | 2277597 C2 | 6/2006 |
| RU | 2531498 C1 | 10/2014 |
| WO | WO2013030450 A1 | 3/2013 |
| WO | WO2015024106 A1 | 2/2015 |
| WO | 2015124507 A1 | 8/2015 |
| WO | 2016178073 A2 | 11/2016 |
| WO | WO2016178073 * | 11/2016 ............... C22B 7/00 |

OTHER PUBLICATIONS

Peter van Herck et al.:"Zinc and Lead Removal from Blast Furnace Sludge with a Hydrometallurgical Process," Environmental Science & Technolog, vol. 34, No. 17, Sep. 1, 2000.

* cited by examiner

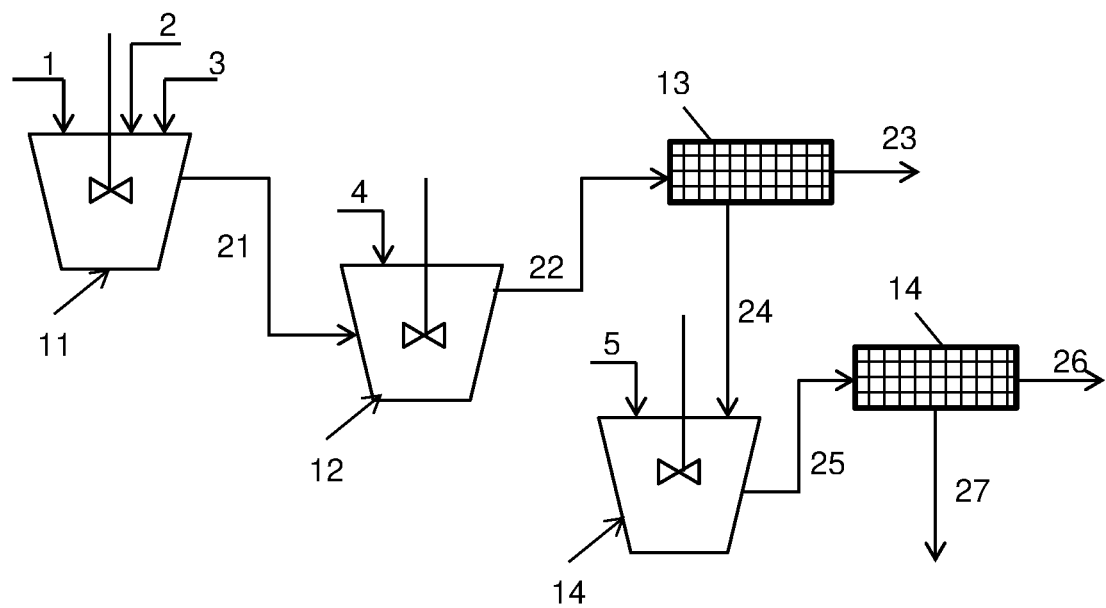

METHOD FOR THE TREATMENT OF IRON-CONTAINING SLUDGE

BACKGROUND

During production of pig iron, gases containing dusts are emitted and exit through the top of the blast furnace. In order to be recycled, the gases must be cleaned from these dusts. Two methods are used to perform this cleaning step, a dry cleaning using dusts catchers and/or cyclones which collect the biggest dust particles that are then directly sent to the sintering plant, and a wet cleaning, in washers, collecting the finest dust particles in water. The residue of this wet cleaning step constitutes sludge.

The average composition of this sludge is 15% to 25% by weight of iron, 30% to 50% by weight of carbon, 2% to 12% by weight of zinc and 0.5% to 2% of lead. Zinc and lead are present as PbO and ZnO oxides but also notably as ZnS sulfides, also named sphalerite, as PbS sulfides and as pure metals, Zn and Pb.

Due to their high content in zinc and lead, these sludges cannot be directly recycled in the sinter plant. Generally, sinter plants allow the recycling of by-products having content below 0.4% by weight of zinc and below 0.1% by weight of lead. It is therefore necessary to further treat such sludge to lower down their heavy metals contents.

Hydrometallurgical processes are well-known solutions to remove impurities from solids or sludge. These processes include a leaching step basically consisting in mixing the solid to be treated with a liquid containing a leaching agent such as NaOH, NH$_3$ or H$_2$SO$_4$. The impurities of the solid react with the leaching agent and are transferred to the liquid. The result of the leaching step is so a mixture of a leached solid or sludge and a leaching residual liquid, named leachate. This leachate contains notably iron and carbon which may be recovered for reuse at the sinter plant.

Patent application WO2016/178073 describes a method of treatment of blast furnace sludge wherein the sludge is subjected to a leaching step with hydrochloric acid and chlorate. The leachate resulting from this step is first oxidized and then subjected to an iron precipitation step by lime addition. The solid part resulting from these subsequent steps can be recycled to the sinter plant in substitute to external iron and carbon sources. This process implies use of multiple reactive agents, such as acid, chlorates, lime which may be detrimental to the environment. For example, the production of lime implies big energy consumption and release of CO$_2$ in the atmosphere.

Patent application WO2015/124507 describes also a method of treatment of sludge wherein it is subjected to several steps, among them a leaching step with hydrochloric acid and manganese dioxide and an iron precipitation step with addition of a neutralizing agent which is lime and the injection of air and/or oxygen in the mixture. As for the previous method, multiple reactive agents are involved into subsequent reactions.

SUMMARY OF THE INVENTION

There is so a need for a treatment method which has a reduced impact on the environment.

The present invention provides a treatment method of sludge containing iron, said method comprising:
- a leaching step wherein the sludge containing iron is mixed with an acid and an oxidation agent so as to create an oxidized leachate, and
- a step of precipitation of iron wherein the oxidized leachate is mixed with a neutralizing agent so as to create a mixture composed of a solid part comprising precipitated iron and of a liquid part, the neutralizing agent comprising at least 30% in weight of dust recovered from a bag filter treatment of ironmaking, steelmaking, coke making or sintering gas.

The treatment method according to the invention may also comprise following characteristics, taken alone or in combination:
- the neutralizing agent comprises less than 65% in weight of lime,
- after the step of precipitation of iron, the mixture is subjected to a separation step so as to recover separately the solid part containing carbon and precipitated iron and the liquid part
- the solid part comprises at least 8% in weight of iron, at least 15% in weight of carbon, less than 0.4% in weight of zinc and less than 0.1% in weight of lead.
- the dust comprises less than 0.1% w of zinc, less than 1% w of lead, between 0.5% w and 2.5% w of silica SiO$_2$, between 2 and 5% of potassium, between 2% w and 5% w of chloride, less than 2% w of Sulphur, at least 8% w of iron, at least 10% w of carbon, at least 25% w of calcium oxide and between 1 and 3% w of magnesium oxide, balance being oxygen and unavoidable impurities
- the sludge containing iron is blast furnace sludge.

Other characteristics and advantages of the invention will appear upon reading of the following description.

BRIEF DESCRIPTION OF THE DRAWINGS

In order to illustrate the invention, trials have been performed and will be described by way of non-limitative examples, notably in reference to FIGURE which represent:

FIG. 1 is a schematic view of one embodiment of a method according to the invention

DETAILED DESCRIPTION

In FIG. 1 is illustrated a device to perform a treatment method according to an embodiment of the invention. Sludge 1, such as blast furnace sludge, is poured into a tank 11 where it is mixed with an acid 2, such as hydrochloric acid HCl and an oxidizing agent 3, such as an aqueous solution of NaClO$_3$. Mixing the leaching agents with the sludge produces a leachate 21, which is composed of a solid and a liquid part. The duration of the leaching step 2 is preferably comprised between 30 min and 2 h. A specific leaching step is here described at matter of illustration but the invention encompasses any leaching step using an acid and an oxidizing agent.

The hydrochloric acid HCl notably reacts with zinc and lead oxides according to following reactions:

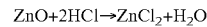
ZnO+2HCl→ZnCl$_2$+H$_2$O

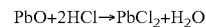
PbO+2HCl→PbCl$_2$+H$_2$O

Zinc and lead chlorides thus produced are water soluble.

The hydrochloric acid HCl also reacts with iron oxides according to the following reaction:

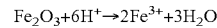
Fe$_2$O$_3$+6H$^+$→2Fe$^{3+}$+3H$_2$O

The Fe$^{3+}$ ions thus formed may react with zinc according to the following reactions:

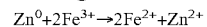
Zn$^0$+2Fe$^{3+}$→2Fe$^{2+}$+Zn$^{2+}$

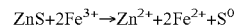
ZnS+2Fe$^{3+}$→Zn$^{2+}$+2Fe$^{2+}$+S$^0$

In the meantime, the oxidizing agent 3 reacts with zinc and lead present in the initial sludge 1 so as to turn into water soluble elements which are removed from the sludge 1 and transferred to the liquid part of the leachate 21. This leachate 21 contains notably $Fe^{2+}$, $Fe^{3+}$, $Zn^{2+}$, $Pb^{2+}$.

To recover iron, it is necessary to have this element only under the form of $Fe^{3+}$, meaning that $Fe^{2+}$ ions have to oxidize. This oxidation step can be done by using chlorate ions:

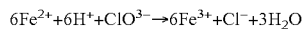

$$6Fe^{2+}+6H^{+}+ClO^{3-}\rightarrow 6Fe^{3+}+Cl^{-}+3H_2O$$

It can occur through a specific oxidation step or together with the leaching step by having an initial concentration of oxidizing agent 3 higher than necessary for the mere reaction with zinc and lead.

If done through a specific oxidation step, it consists in adding an oxidizing agent such as chlorate, for example by using a solution of $NaClO_3$, to the leachate 21.

The product of this oxidation is an oxidized leachate 21 comprising notably $Fe^{3+}$, $Zn^{2+}$, $Pb^{2+}$.

To recover iron, the oxidized leachate 21 is sent to a second tank 12 to be subjected to an iron precipitation step. This iron precipitation step is realized by mixing a neutralizing agent 4 with the oxidized leachate 21. This addition results in an increase of pH up to a value comprised between 2 and 3, at which $Fe^{3+}$ precipitates as goethite FeOOH. The product of this iron precipitation step is a first mixture 22 composed of a solid part, the leached sludge comprising iron and a liquid part, a residual liquid. Such first mixture 22 is sent to a separation device 13, such as a filter press or a decanter, where solid 23 and liquid 24 phases are separated. The solid phase 23, also called cake, is a concentrate of iron and carbon which can be subjected to further washing and drying steps and recycled to the sintering plant.

According to the invention, the neutralizing agent 4 used for the precipitation step contains dust recovered from a bag filter treatment of gas. A baghouse (BH, B/H), bag filter (BF) or fabric filter (FF) is an air pollution control device that removes particulates out of air or gas released from industrial processes, such as steelmaking industry. Most filter bags use long, cylindrical bags (or tubes) made of woven or felted fabric as a filter medium. Exhaust gas or air enter the bag through hoppers and is directed into the baghouse compartment. The gas is drawn through the filters, either on the inside or the outside depending on cleaning method, and a layer of dust accumulates on the filter media surface until air can no longer move through it. Those dusts are then recovered by cleaning of the filters. According to the invention, the neutralizing agent 4 contains at least 30% in weight of dusts recovered from the filter bag treatment of gas. These dusts are dusts recovered from the filter bag treatment of ironmaking, steelmaking, coke making or sintering gas.

The sinter plant is a plant within the steelmaking shop where, basically, raw iron ore is mixed notably with a carbon-containing material and a fluxing agent, the mix thus created being then sintered so as to form iron agglomerates. These agglomerates are then loaded to the blast furnace to create pig iron. This process emits a lot of combustion gases which contain dust coming from the different materials used. Those gases are captured to avoid their release into the atmosphere and treated to remove those dusts by filter bag treatment. The use of these dusts has proven several advantages, notably for the environment. Indeed, the consumption of an external neutralizing agent, such as lime, is reduced without having a detrimental impact on the treatment of the sludge, unwanted compounds such as zinc and lead being still removed within the required limits. Moreover, the use of those dusts allows obtaining a cake with higher carbon and iron content. It so improves the recycling rate of the cake 23 to the sinter plant, where it replaces raw iron material. It so also reduces the consumption of raw materials at the sinter plant. In a preferred embodiment the solid part comprises at least 8% in weight of iron, at least 15% in weight of carbon, less than 0.4% in weight of zinc and less than 0.1% in weight of lead.

In a preferred embodiment the dusts comprise less than 0.1% w of zinc, less than 1% w of lead, between 0.5% w and 3.5% w of silica $SiO_2$, between 2 and 11% of potassium, between 2% w and 10% w of chloride, less than 3% w of sulphur, at least 8% w of iron, at least 15% w of carbon, at least 25% w of calcium oxide and between 1 and 3% w of magnesium oxide, balance being oxygen and unavoidable impurities.

The residual liquid 24 still contains zinc and lead which can be recovered. To do so, the residual liquid 24 is submitted to a zinc and lead precipitation step. This zinc and lead precipitation step may be realized by pouring the residual liquid 24 in a third tank 13 where it is mixed with an alkaline component 5, such as lime. This addition results in an increase of the pH of the liquid, preferably until 9.5, at which zinc and lead hydroxides $Zn(OH)_2$ and $Pb(OH)_2$ precipitate.

The product of this zinc and lead precipitation step is a second mixture 25 composed of a solid part, a concentrate of zinc and lead 26, and of a liquid part, an effluent 27. Such second mixture 25 is sent to a separation device 14, such as a filter press or a decanter, where solid 26 and liquid 27 phases are separated. The concentrate 26 of zinc and lead may be recycled to a Waelz furnace, and the effluent 25 may be treated with other effluents from the plant.

Results

Sludge coming from the blast furnace has been subjected to a treatment according to the prior art (Method 1) and according to an embodiment of the invention (method 2). Results are presented in table 1. The initial composition of the sludge was (in % weight), remainder being oxygen:

| Zn | Pb | $SiO_2$ | K | Cl | S | Fe | C | CaO | MgO |
| --- | --- | --- | --- | --- | --- | --- | --- | --- | --- |
| 7.34 | 0.57 | 4.84 | 0.55 | 0.03 | 3.1 | 13.4 | 48.0 | 4.13 | 0.64 |

In both methods sludge was first subjected to a leaching step in a first tank during which it was mixed with hydrochloric acid HCl and with an aqueous solution of sodium chlorate $NaClO_3$. Reactions previously described occurred and a leachate was formed. $NaClO_3$ was added in sufficient quantity to oxidize this leachate so as to get the iron ores under their required oxidized form $Fe3^+$. This oxidized leachate was then poured in a second tank to perform the iron precipitation step.

In method 1, according to the prior art, this iron precipitation step was performed using lime as neutralizing agent. In method 2, according to the invention, the neutralizing agent used was a mixture of lime and dust from the filter bag treatment of sinter gas. The composition of the dust used was as follows (in % weight), remainder being oxygen:

| Zn | Pb | $SiO_2$ | K | Cl | S | Fe | C | CaO | MgO |
| --- | --- | --- | --- | --- | --- | --- | --- | --- | --- |
| 0.03 | 0.66 | 1.9 | 4.1 | 3.8 | 1.0 | 9.3 | 19.9 | 29.2 | 1.4 |

Then, in both methods, solid and liquid parts resulting from the iron precipitation step were separated in a filter press. The solid part, also named cake, was analyzed to determine its iron and carbon content. The liquid part was then sent to a third tank where it was subjected to a zinc and lead precipitation step by mixing with lime. The products of this zinc and lead precipitation step are Zn/Pb concentrate and wastewaters which are separated by filter press. The Zn/Pb concentrate was analyzed to determine its zinc and lead content.

TABLE 1

|  | Method 1 (prior art) | Method 2 (Invention) |
|---|---|---|
| Sludge to be treated (kg) | 1000 | 1000 |
| Fabric Filter dust used in iron precipitation step (kg) | — | 80 |
| Lime consumption (kg) | 160 | 138 |
| HCl consumption (kg) | 670 | 670 |
| C and Fe in cake (kg) | 749 | 775 |
| Zn and Pb in cake (% w) | 0.15 | 0.14 |

As can be seen from table 1 the method according to the invention allows reduction in consumption of lime, while keeping the removal rate of zinc and lead in the required limits. Moreover, the method according to the invention allows obtaining a cake with a higher content in carbon and iron, which increase the quantity of external carbon and iron sources it can substitute to at the sinter plant. All these advantages contribute to a reduction of the environmental impact.

What is claimed is:

1. A method for the treatment of sludge containing iron, the method comprising:
   leaching the sludge containing iron by mixing the sludge containing iron with an acid and an oxidation agent so as to create an oxidized leachate; and
   precipitating the iron by mixing the oxidized leachate with a neutralizing agent so as to create a mixture composed of a solid part including precipitated iron and a liquid part, the neutralizing agent including at least 30% in weight of dust recovered from a bag filter treatment of sintering gas.

2. The method as recited in claim 1 wherein the neutralizing agent includes less than 65% in weight of lime.

3. The method as recited in claim 1 further comprising, after the precipitation of the iron, separating the mixture so as to recover separately the solid part including the precipitated iron and the liquid part, the solid part further including carbon.

4. The method as recited in claim 3 wherein the solid part includes at least 8% in weight of iron, at least 15% in weight of carbon, less than 0.4% in weight of zinc and less than 0.1% in weight of lead.

5. The method as recited in claim 1 wherein the solid part includes at least 8% in weight of iron, at least 15% in weight of carbon, less than 0.4% in weight of zinc and less than 0.1% in weight of lead.

6. The method as recited in claim 1 wherein the dust includes less than 0.1% w of zinc, less than 1% w of lead, between 0.5% w and 2.5% w of silica $SiO_2$, between 2 and 5% of potassium, between 2% w and 5% w of chloride, less than 2% w of sulphur, at least 8% w of iron, at least 10% w of carbon, at least 25% w of calcium oxide and between 1 and 3% w of magnesium oxide, a balance being oxygen and unavoidable impurities.

7. The method as recited in claim 4 wherein the dust includes less than 0.1% w of zinc, less than 1% w of lead, between 0.5% w and 2.5% w of silica $SiO_2$, between 2 and 5% of potassium, between 2% w and 5% w of chloride, less than 2% w of sulphur, at least 8% w of iron, at least 10% w of carbon, at least 25% w of calcium oxide and between 1 and 3% w of magnesium oxide, a balance being oxygen and unavoidable impurities.

8. The method as recited in claim 5 wherein the dust includes less than 0.1% w of zinc, less than 1% w of lead, between 0.5% w and 2.5% w of silica $SiO_2$, between 2 and 5% of potassium, between 2% w and 5% w of chloride, less than 2% w of sulphur, at least 8% w of iron, at least 10% w of carbon, at least 25% w of calcium oxide and between 1 and 3% w of magnesium oxide, a balance being oxygen and unavoidable impurities.

9. The method as recited in claim 1 wherein the sludge containing iron is blast furnace sludge.

10. The method as recited in claim 2 wherein the sludge containing iron is blast furnace sludge.

11. The method as recited in claim 3 wherein the sludge containing iron is blast furnace sludge.

12. The method as recited in claim 4 wherein the sludge containing iron is blast furnace sludge.

13. The method as recited in claim 5 wherein the sludge containing iron is blast furnace sludge.

14. The method as recited in claim 6 wherein the sludge containing iron is blast furnace sludge.

15. The method as recited in claim 7 wherein the sludge containing iron is blast furnace sludge.

16. The method as recited in claim 8 wherein the sludge containing iron is blast furnace sludge.

17. The method as recited in claim 1 wherein the oxidizing agent consists of chlorates and chlorate ions.

18. The method as recited in claim 1 wherein the neutralizing agent comprises a mixture comprising the dust recovered from the bag filter treatment of sintering gas and lime.

* * * * *